US012677836B2

(12) United States Patent　　　　(10) Patent No.:　US 12,677,836 B2

Milling　　　　　　　　　　　　　　(45) Date of Patent:　Jul. 14, 2026

(54) COPPER BASED PESTICIDES

(71) Applicant: AGRONATURALIS LTD, Ringwood (GB)

(72) Inventor: Richard Milling, Manchester (GB)

(73) Assignee: AGRONATURALIS LTD, Ringwood (GB)

( * ) Notice: Subject to any disclaimer, the term of this patent is extended or adjusted under 35 U.S.C. 154(b) by 261 days.

(21) Appl. No.: 18/031,988

(22) PCT Filed: Oct. 15, 2021

(86) PCT No.: PCT/EP2021/078709

§ 371 (c)(1),
(2) Date: Apr. 14, 2023

(87) PCT Pub. No.: WO2022/079299

PCT Pub. Date: Apr. 21, 2022

(65) Prior Publication Data

US 2023/0380424 A1　　Nov. 30, 2023

(30) Foreign Application Priority Data

Oct. 15, 2020　(GB) ...................................... 2016365

(51) Int. Cl.

| | |
|---|---|
| *A01N 59/20* | (2006.01) |
| *A01N 25/06* | (2006.01) |
| *A01N 25/30* | (2006.01) |
| *A01P 3/00* | (2006.01) |
| *A01P 7/02* | (2006.01) |
| *A01P 7/04* | (2006.01) |
| *A01P 15/00* | (2006.01) |

(52) U.S. Cl.

CPC ............. *A01N 59/20* (2013.01); *A01N 25/06* (2013.01); *A01N 25/30* (2013.01); *A01P 3/00* (2021.08); *A01P 7/02* (2021.08); *A01P 7/04* (2021.08); *A01P 15/00* (2021.08)

(58) Field of Classification Search

CPC ........ A01N 59/20; A01N 25/06; A01N 25/30; A01P 15/00; A01P 7/04; A01P 7/02; A01P 3/00

See application file for complete search history.

(56) References Cited

U.S. PATENT DOCUMENTS 3,992,146 A　　11/1976　Fazzalari

FOREIGN PATENT DOCUMENTS

| | | | |
|---|---|---|---|
| CN | 104186499 A | * | 12/2014 |
| CN | 104705293 A | | 6/2015 |
| DE | 102017008140 A1 | | 3/2018 |
| EP | 1911557 A1 | | 4/2008 |
| WO | 2017/037277 A1 | | 3/2017 |
| WO | 2018/036579 A1 | | 3/2018 |
| WO | 2020/161297 A1 | | 8/2020 |

OTHER PUBLICATIONS

English translation of CN-104186499-A from EPO. (Year: 2024).*
International Search Report and Written Opinion dated Jan. 20, 2022, for International Application PCT/EP2021/078709.
GB Search Report dated Mar. 15, 2021, for GB2016365.5.
Indian Examination Report dated Feb. 25, 2026, for Indian Application No. 202317031992.

* cited by examiner

*Primary Examiner* — Michael P Cohen
(74) *Attorney, Agent, or Firm* — The Dobrusin Law Firm, P.C.

(57) ABSTRACT

The effect of aqueous compositions of copper based fungicides is improved by including a mixture of sodium dioctyl sulfosuccinate and sodium lauryl sulphate surfactants in the aqueous composition which does not require the presence of a bicarbonate.

14 Claims, No Drawings

COPPER BASED PESTICIDES

The present invention relates to the use of copper as an agrochemical and in particular to the use of copper as a fungicide and/or as an insecticide. In one embodiment the invention is concerned with improving the dispersion and retention of the copper on the vegetation where it is used. The invention is concerned with an aqueous copper based formulation which can be supplied for further dilution with water for application to vegetation and is also concerned with the further diluted sprayable composition as well as the use of the sprayable composition for the treatment of various diseases on crops such as the treatment of downy mildew on grape vines.

Copper is widely used in agriculture and horticulture as a pesticide usually as an aqueous suspension of finely milled particles of copper compounds. The biologically active component is the Cu++ ion and examples of copper compounds that are used to provide the ions include copper sulphate, copper hydroxide, cuprous oxide, copper oxychloride, copper ammonium carbonate and copper octanoate. Whilst copper compounds are effective pesticides there are however concerns that their use can lead to the build-up of copper in soil causing the formation of undesirably high heavy metal deposits. There is therefore a need to improve the effectiveness of copper pesticides to enable the desired effect at lower treat rates.

Copper is widely used in agriculture and horticulture as a fungicide and bactericide particularly to prevent or reduce the formation of scab and canker on apples and the formation of downy mildews, fire blight and late blights, Alternaria, Stemphylium, Taphrina and other leaf spot fungal and bacterial diseases on grapevines, hops, fruit and nuts, vegetables and ornamentals. It is also used on some arable crops such as potatoes for control of late blight, and on beet such as sugar beet and cereals for the control of leaf spot diseases. These fungi tend to be dispersed via airborne spores and via rain splash in the field, spreading from one plant or part of the plant to another; the copper is used to prevent or limit access of the fungi to the plant tissues.

Copper is also used on many other crops such as citrus, olives, peanuts, cocoa, coffee, rubber, tea, tobacco and the like.

Agricultural production worldwide is under permanent threat from numerous insects, mites, phytopathogenic fungi and bacteria. For the protection of yield and quality of produce and to avoid economic losses, the application of agents that control plant diseases is an absolute requirement. Although the need for pesticides is generally acknowledged there is an ongoing public concern about the negative impact of pesticides on the environment and on human health. There is a general concern about the environmental aspect of agrochemicals and the present invention provides a method whereby the amount of copper required for effective treatment may be reduced perhaps by as much as 50% at any particular time during the growing season.

Copper is typically applied to vegetation during the growing season and is applied to both the foliage of the plants and the fruit as they develop during the growing season. Copper acts preventively, through direct contact of the Cu++ ions to the pest (fungal spores or hyphae) on the plant surface. Generally the amount of copper that is applied per hectare increases throughout the growing season as the size of the plant (both foliage and produce) increases. Regulatory pressure, notably in Europe, is increasingly restricting the use of copper-based products to limit the total amount of copper applied per hectare in a year or successive years. This is leading to reduced numbers of applications allowed per crop and season for existing products.

Copper use as an agrochemical is typically by spraying of an aqueous composition of the copper compound containing various adjuvants and in the case of vegetation onto the leaves and produce of the crop. The preferred composition is an aqueous dispersion of finely milled particles of the copper compound. Typically solid or concentrated compositions of the copper compound are supplied to the grower who will mix the formulation with water in a spray tank and then spray the suspension or solution onto the vegetation. Additionally the formulation may contain other agrochemicals such as other fungicides and insecticides.

Most aerial vegetation, particularly leaves and stems, has a thin waxy surface layer, the cuticle, which is highly hydrophobic. Some of the aqueous spray compositions of copper products that are sprayed onto the vegetation will not be retained on the vegetation and will simply run off the plant surfaces. This can result in inadequate treatment of the vegetation or the requirement of larger amounts of products to be applied in order to obtain the desired protection of the crop. Additionally the lack of retention of the composition on the vegetation often results in uneven distribution of the copper across the vegetation resulting in untreated areas which will not be protected from fungal infections. Furthermore if the aqueous copper formulation runs off the vegetation this can lead to an undesirable build up of copper in the soil. The present invention addresses these problems.

In this application when we refer to a formulation or a preparation we refer to a composition suitable for dilution with water to produce an aqueous spray composition. When we refer to a spray or sprayable composition we refer to the further diluted formulation or preparation for use in crop spraying. Copper is barely soluble in water and hence the formulations and sprayable compositions of this invention may be solutions or suspensions of the copper.

PCT publication WO2018/036579 relates to a preparation for use as a plant protection agent which has at least one copper containing component, at least one basic component and at least one wetting agent and the wetting agent is selected from sodium dioctyl sulfosuccinate or a combination of sodium dioctyl sulfosuccinate and sodium lauryl sulfate and the basic component is potassium hydrogen carbonate and/or sodium hydrogen carbonate. According to WO2018/036579 the combination of copper hydroxide with the basic component increases the free availability of the copper ions whereas previously it was considered that the availability of free copper ions could only be achieved by acidification. The active mechanism is said to be the formation of intermediary carbonate/copper complexes with a hydrogen carbonate before it is fixed as basic copper carbonate.

WO 2018/036579 does not describe the function of the wetting agent although the patentee states that the presence of the wetting agent can further increase the availability of copper ions when WO2018/036579 uses a mixture of sodium dioctyl sulfosuccinate and sodium lauryl sulphate together with potassium bicarbonate. Furthermore WO2018/036579 does not consider the preferred amount of the mixture of the two surfactants that should be employed in the formulation and additionally does not consider the ratio of the two surfactants that should be employed. Furthermore WO2018/036579 does not illustrate the treatment of vegetation with a formulation containing the mixture of surfactants. Accordingly WO2018/036579 is concerned with chemically increasing the availability of copper ions within a formulation intended for further dilution with water to provide an agrochemical spray composition by the addition of a bicarbonate. Whereas the present invention is primarily concerned with the physical agrochemical performance of the diluted spray composition once it has been sprayed on the vegetation.

We have now found that providing from 15% to 300% by weight of a mixture of sodium dioctyl sulfosuccinate and sodium lauryl sulphate based on the weight of copper metal is used in the formulation and that the mixture preferably contains the two surfactants in a ratio of from 2:1 to 1:2 upon further dilution the effectiveness of an aqueous composition of a copper containing pesticide can be increased. We have also found that there is no need to include a basic bicarbonate salt in order to get the improved effectiveness. It is believed that the improved performance is due to the control of the surface tension of the spray solution provided by the use of the mixture of the surfactants and also the control of the contact angle of the solution on the vegetation also provided by the mixture of surfactants.

The present invention therefore provides a pesticide preparation comprising an aqueous composition containing 0.010 wt % to 3 wt % preferably 0.015 wt % to 3 wt % of copper metal 0.0025 wt % to 10 wt % of a mixture of sodium dioctyl sulfosuccinate and sodium lauryl sulphate preferably in a ratio of from 2:1 to 1:2 parts by weight The preparation is preferably free of bicarbonate salts, such as potassium and sodium bicarbonate.

The preparation is preferably an aqueous suspension of finely milled particles of the copper compound. Preferably the particles are of average particle size of from 1 to 15 microns, more preferably 2 to 5 microns.

We prefer to use from 0.001% to 6 wt % of the surfactant mixture in the aqueous preparation more preferably we use from 0.01 to 1 wt % most preferably we use 0.02 to 0.4 wt % and we have found that by using this amount of the surfactants in the preferred ratios the amount of surfactant is optimised to achieve the desired wetting of the crop by the spray composition derived from the preparation and thus use of the surfactant mixture enables the amount of copper metal that is required to be applied to achieve a particular effect to be reduced.

In WO2017/037277 we describe how a combination of sodium dioctyl sulfosuccinate and sodium lauryl sulfate may be used with the water soluble fungicide potassium bicarbonate to control the surface tension and contact angles of the spray droplets and the crystal size of the potassium bicarbonate that is deposited on the vegetation once the water used in the spray solution has evaporated.

The use of the surfactant mixture of this invention improves the retention of the copper containing aqueous spray compositions on vegetation when the compositions are sprayed onto the vegetation. By retaining the spray composition on the vegetation, more copper remains on the vegetation when the water of the aqueous spray composition evaporates and less runs off and is wasted providing more copper compound on the vegetation to provide the Cu++ ions that have the pesticidal effect. Accordingly the use of the surfactant mixture results in a more efficient use of the copper enabling a smaller amount to be used to obtain a desired degree of treatment.

The use of the surfactant mixture also improves the distribution of the aqueous spray composition on vegetation when it is applied onto the vegetation. By improving the distribution on the vegetation a more uniform pattern of the copper compound is formed when the water of the aqueous spray evaporates thus resulting in more uniform treatment across the whole surface of the vegetation providing improved treatment for a given amount of the copper compound.

The pesticides envisaged by this invention may be insecticides or fungicides and spray compositions of the invention are useful for inhibiting, ameliorating, preventing or treating a plant and/or soil for insect infestation such as treatment for aphids and/or fungal disease such as scab, downy mildew, late blight, Alternaria, Stemphylium, Taphrina, Septoria and other leaf spot diseases, mites, flies, scales, psyllids or thrips and the invention is particularly useful as a fungicide and in a preferred embodiment is used for the prevention of downy mildew on lettuce and grape vines and for the prevention of Sclerotinia on oilseed rape and for the prevention of Cercospora on sugar beet.

In preferred embodiments the formulations and the preparations of the invention may include at least one further surfactant and an anionic surfactant is preferred as the further surfactant. The further surfactant may be one or more anionic surfactants selected from phosphate esters, substituted and non-substituted sulphonic acids, and their salts, monosulphate esters, naphthalene sulphonic acid derivatives, sulphonated vegetable oils, sulphonated esters of natural fatty acids, carboxylic acid derivatives, alkyl substituted succinic acid, polycarboxylic acid salts and many others. We prefer that the further surfactant is not an amphoteric surfactant and in one embodiment of the invention an amphoteric surfactant is excluded.

The formulation of this invention and the spray composition that is used in this invention comprise a copper compound and sodium dioctyl sulfosuccinate and sodium lauryl sulfate and it is preferred that the amount of the sodium lauryl sulfate present in the formulation is equal to, less than or greater than the amount of sodium dioctyl sulfosuccinate; the amount being by weight. The copper in the formulations and the preparations is preferably provided by a copper compound which is preferably selected from copper sulfate, copper hydroxide, cuprous oxide, copper oxychloride, copper ammonium carbonate and copper octanoate. Copper hydroxide is particularly preferred.

Accordingly a preferred formulation for mixing with water to produce an aqueous pesticide spray solution according to this invention comprises i) From 5 wt % to 30 wt % of copper metal ii) From 0.25 wt % to 60 wt % sodium dioctyl sulfosuccinate iii) From 0.25 wt % to 60 wt % sodium lauryl sulfate.

iv) No bicarbonate salts

It is further preferred that the ratio of the amount of copper to the combined amount of sodium dioctyl sulfosuccinate and sodium lauryl sulfate in this preferred composition is not below 1:1.

More preferably the composition has the formulation i) From 5 wt % to 30 wt % of copper metal ii) From 3 wt % to 40 wt % sodium dioctyl sulfosuccinate iii) From 3 wt % to 40 wt % sodium lauryl sulfate.

iv) No bicarbonate salts

It is further preferred that the ratio of the amount of copper to the combined amount of sodium dioctyl sulfosuccinate and sodium lauryl sulfate is not below 1:1.

Even more preferred is a formulation comprising i) From 5 to 10 wt % copper ii) From 1 to 30 wt % sodium dioctyl sulfosuccinate iii) From 1 to 30 wt % sodium lauryl sulfate The copper metal being derived from a copper compound.

These compositions can be mixed with water to provide a pesticide spray composition typically they are diluted 75-1500 fold and a preferred solution is one that contains from 0.010 to 3 wt %, preferably 0.015% to 3% copper metal, preferably 0.05% to 0.3% copper metal, more preferably 0.25% to 1.5% copper metal most preferably 0.003 to 0.4 wt % copper metal together with the surfactant mixture diluted respectively to the same degree.

As mentioned one feature of this invention is the recognition that the use of the surfactant combination of this invention enables the desired fungicidal effect to be achieved without enhancing the presence of free copper ions by the presence of bicarbonate salts such as potassium or sodium bicarbonate. The treatment rate that should be used depends upon the nature of the crop being treated, the nature of the fungus or pest to be treated and the stage of growth of the crop during the growing season. We have however found that in many instances the invention enables a reduction in the necessary treatment rate in copper metal to achieve a desired pesticidal effect of 40% or more typically 50% to 60%.

The improved retention of the copper on the vegetation and the improved dispersion is believed to arise from the degree of wetting of the surface of the vegetation by the spray solution. This in turn is determined by the surface tension and contact angle of the droplets on the vegetation as provided by the use of the mixture of surfactants. We have found that typically a contact angle from 40° to 60° is desirable. Additionally we have found that smaller angles typically result in over-wetting of surfaces with spray droplets running off the crop surface whilst angles above 60° result in incomplete wetting and areas left untreated.

The formulation and spray composition may contain other traditional additives such as dispersants, wetting agents, antifoam additives, antifreeze and rheology modifiers. Antifoam additives such as siloxane antifoam additives being particularly useful to combat the tendency of the mixture of sodium dioctyl sulfosuccinate and sodium lauryl sulfate to foam when the spray composition is delivered and during preparation of the formulation. Typically the spray solution may contain from 0.05 to 0.1 wt % of such an antifoam additive.

The formulations should also be storage stable under ambient conditions preferably for at least two years to enable the user to store supplies until required.

The present invention is illustrated by the following Examples

EXAMPLE 1

A formulation (comparative formulation) containing
i. 708 grams per kilo of potassium bicarbonate
ii. 100 grams per kilo of copper hydroxide to provide 65.15 grams per kilo of copper metal
iii. 125 grams per kilo of a 2:1 mixture of sodium dioctyl sulfosuccinate and sodium lauryl sulfate
was compared with a formulation (inventive) containing
i. 18.0 wt % copper hydroxide to provide 11.7 wt % copper metal
ii. 22.5 wt % of a 2:1 mixture of sodium dioctyl sulfosuccinate and sodium lauryl sulfate
The copper hydroxide was milled to an average particle size in the range 1 to 5 microns. The formulations were mixed with water to provide an aqueous suspension of copper hydroxide and tested for control of the fungus *Sclerotinia sclerotiorum* on stems and pods of oilseed rape by spraying onto the oilseed rape 2.5 and 5 litres per hectare of the inventive spray composition and 2.5 and 5 kilograms per hectare of the comparative (bicarbonate containing) preparation each applied in 300 litres water volume per hectare.

The performance was also compared with a fungicide Efilior from Certis Europe B.V. (133 g/l boscalid+60 g/l metconazole SC).

The results were as follows.

| | PESSEV stems | PESINC stems | PESSEV pods | Yield (Kg/m$^2$) |
|---|---|---|---|---|
| UTC | 25.00a | 24.00a | 22.50a | 5.11 |
| 2.5 kg/ha CF | 21.25ab | 10.75b | 13.75bc | 5.18 |
| 5 kg/ha CF | 12.50bc | 9.00b | 9.75bcd | 5.41 |
| 2.5 l/ha IF | 13.75bc | 9.00b | 13.75bc | 5.56 |
| 5 l/ha IF | 15.50abc | 6.75b | 7.75cd | 5.71 |
| 1 l/ha ref. | 4.75c | 2.50b | 3.75d | 5.63 |

PESSEV = pest severity (%)
PESINC = pest incidence (%)
UTC = untreated control
CF = comparative formulation
IF = inventive formulation
Ref. (reference fungicide) = Efilior
Values followed by same letter or symbol do not significantly differ (P = 0.05 Student-Newman-Keuls)

Control of Sclerotinia disease on stems with the preparation of the inventive formulation was at least as good as that of the preparation of the comparative formulation, and better on pods than the preparation of the comparative formulation. The yields of rape seed from the crop sprayed with the preparation of the inventive formulation were considerably higher than the yields of the crop sprayed with the preparation of the comparative formulation.

EXAMPLE 2

The spray compositions of the inventive formulation and the comparative formulation of Example 1 were applied to sugar beet at respective treat rates of 2.5 and 5 litres and 2.5 and kilograms per hectare to investigate the control of the fungus Cercospora beticola. The crop was evaluated by counting the leaves of the middle crown of 25 plants showing symptoms prior to treatment and 14 days after treatment and after a further 14 days and again after 30 days.

The results were compared with similar crops treated with the conventional fungicide Amistar Gold from Syngenta (125 g/l azoxystrobin+125 g/l difenoconazole SC) and the results were as follows showing the products of the invention to be superior.

| | PESSEV |
|---|---|
| UTC | 26.7a |
| 2.5 kg/ha CF | 13.1bc |
| 5 kg/ha CF | 12.7bc |
| 2.5 l/ha IF | 11.4bc |
| 5 l/ha IF | 9.0c |
| 1 l/ha ref. | 17.6abc |

PESSEV = pest severity (%)
UTC = untreated control
CF = comparative formulation
IF = inventive formulation
Ref. (reference fungicide) = Amistar Gold
Values followed by same letter or symbol do not significantly differ (P = 0.05 Student-Newman-Keuls)

In this trial, the field technician reported a strong infestation of aphids and significant greening effects were observed with the higher dose-rate of the inventive formulation through control of aphids (*Myzus persicae* and *Aphis fabae*) which act as vectors for viral and bacterial diseases.

EXAMPLE 3

Results of tests with Downy Mildew (*Plasmopara viticola*) on Grapevine Seedlings Grapevine seedlings were cultivated under controlled environment conditions and treated with Cuprozin Progress by spraying to run-off at the four leaves phenological stage. 24 hours after treatment, foliar discs were placed in Petri-dishes and inoculated with a spore suspension of *Plasmopara viticola* on the abaxial surface of the leaves. Scoring for disease symptoms was carried out after 6-9 days in a growth chamber (18° C., 16 h photoperiod, 60% relative humidity).

Disease severity was calculated from a quantitative notation scale ranging from 0-100% of sporulation. Cuprozin Progress was applied at 5 and 20 ppm alone or in mixture with adjuvant combination AD-001 at 5-125 ppm as aqueous spray formulations. Statistical analysis was performed to determine if results were significantly different at 95% confidence limit (n=40). Disease incidence was 100% in the untreated control (UTC).

The results were as follows.

| Treatment | Disease Severity (%) | Efficacy against *Plasmopara viticola* (%) |
|---|---|---|
| Water control (UTC) | 76 | — |
| 5 ppm Cuprozin Progress | 61.7 | 18.8 |
| 20 ppm Cuprozin Progress | 50.1 | 34.1 |
| 5 ppm Cuprozin Progress + 5 ppm AD-001 | 56.1 | 26.2 |
| 5 ppm Cuprozin Progress + 20 ppm AD-001 | 52.3 | 31.2 |
| 5 ppm Cuprozin Progress + 50 ppm AD-001 | 48.9 | 35.7 |
| 5 ppm Cuprozin Progress + 125 ppm AD-001 | 40.7 | 46.5 |
| 20 ppm Cuprozin Progress + 5 ppm AD-001 | 43.6 | 42.7 |
| 20 ppm Cuprozin Progress + 20 ppm AD-001 | 40.9 | 46.3 |
| 20 ppm Cuprozin Progress + 50 ppm AD-001 | 39.4 | 48.1 |
| 20 ppm Cuprozin Progress + 125 ppm AD-001 | 41.7 | 45.1 |
| 5 ppm AD-001 | 79.9 | −5.1 |
| 20 ppm AD-001 | 75.6 | 0.5 |
| 50 ppm AD-001 | 63 | 16.5 |
| 125 ppm AD-001 | 59 | 22.6 |

Cuprozin Progress is a suspension concentrate product obtained from Certis Europe B.V. containing 383 g/l copper hydroxide (28.7% w/w). AD-001 is a combination of two surfactants, sodium lauryl sulphate (SLS) and sodium dioctyl sulfosuccinate (SDS) containing 33.3% (w/w) SLS and 66.7% (w/w) SDS.

Compatibility analysis using the Colby formula (1967, 2015) demonstrated synergistic or additive effects with the mixture of Cuprozin Progress and adjuvant combination AD-001.

| Treatment | Expected Value | Observed Value | Type of Combination |
|---|---|---|---|
| 5 ppm Cuprozin Progress + 5 ppm AD-001 | 14.7% | 26.2% | Synergistic |
| 5 ppm Cuprozin Progress + 20 ppm AD-001 | 19.2% | 31.2% | Synergistic |

8

-continued

| Treatment | Expected Value | Observed Value | Type of Combination |
|---|---|---|---|
| 5 ppm Cuprozin Progress + 50 ppm AD-001 | 32.2% | 35.7% | Additive/ Synergistic |
| 5 ppm Cuprozin Progress + 125 ppm AD-001 | 37.2% | 46.5% | Synergistic |
| 20 ppm Cuprozin Progress + 5 ppm AD-001 | 30.7% | 42.7% | Synergistic |
| 20 ppm Cuprozin Progress + 20 ppm AD-001 | 34.4% | 46.3% | Synergistic |
| 20 ppm Cuprozin Progress + 50 ppm AD-001 | 45.0% | 48.1% | Additive/ Synergistic |
| 20 ppm Cuprozin Progress + 125 ppm AD-001 | 49.0% | 45.1% | Additive/ Antagonistic |

With both 5 and 20 ppm Cuprozin Progress, synergism or additive effects with AD001 were seen at adjuvant rates of AD001 of 5-50 ppm.

These results demonstrate the performance of the spray formulations of the invention in relation to powdery mildew on grape vines. Different results would be expected in relation to the treatment of other infections on different vegetation.

EXAMPLE 4

Results of Tests with Downy Mildew (*Bremia lactucae*) on Lettuce

Lettuce seedlings were cultivated under controlled environment conditions and treated with Cuprozin Progress at the first leaf stage. 24 hours after treatment, the seedlings were inoculated with a spore suspension of *Bremia lactucae* and scored for disease symptoms after 11 days.

Disease severity was calculated from a quantitative notation scale ranging from 0-100% leaf surface infected with *Bremia lactucae* sporulation. Statistical analysis was performed to determine if results were significantly different at 95% confidence limit (n=60). Disease incidence was 100% in the untreated control (UTC).

| Treatment | Disease Severity (%) | Efficacy against *Bremia lactucae* (%) | Significant Difference to UTC |
|---|---|---|---|
| Water control (UTC) | 88 | — | — |
| 5 ppm Cuprozin Progress | 75 | 15 | no |
| 50 ppm Cuprozin Progress | 35 | 60 | yes |
| 100 ppm Cuprozin Progress | 14 | 85 | yes |
| 250 ppm Cuprozin Progress | 8 | 92 | yes |
| 500 ppm Cuprozin Progress | 0 | 100 | yes |

Cuprozin Progress is a suspension concentrate (SC) product from Certis Europe B.V. containing 383 g/l copper hydroxide (28.7% w/w).

In a second test, Cuprozin Progress was applied at 50 ppm alone or in mixture with adjuvant combination AD-001 at 250 ppm. Disease incidence was 100% in the untreated control (UTC).

| Treatment | Disease Severity (%) | Efficacy against *Bremia lactucae* (%) | Significant Difference to UTC |
|---|---|---|---|
| Water control (UTC) | 95 | — | — |
| 50 ppm Cuprozin Progress | 57 | 40 | yes |
| 250 ppm AD-001 | 91 | 4 | no |

-continued

| Treatment | Disease Severity (%) | Efficacy against Bremia lactucae (%) | Significant Difference to UTC |
|---|---|---|---|
| 50 ppm Cuprozin Progress + 250 ppm AD-001 | 44 | 54 | yes |

AD-001 is a combination of two surfactants, sodium lauryl sulphate (SLS) and sodium dioctylsulfosuccinate (SDS) containing 33.3% (w/w) SLS and 66.7% (w/w) SDS.

Compatibility analysis using the Colby formula (1967, 2015) demonstrated synergistic efficacy with the mixture of Cuprozin Progress and adjuvant combination AD-001.

| Treatment | Expected Value | Observed Value | Type of Combination |
|---|---|---|---|
| 50 ppm Cuprozin Progress + 250 ppm AD-001 | 43% | 54% | Synergistic |

EXAMPLE 5

The surface wetting and deposition of copper from spray compositions was determined by comparing compositions containing 15 ppm copper hydroxide with varying amounts of sodium lauryl sulfate (Agnique SLS) on its own, varying amounts of sodium dioctyl sulfosuccinate (Geropon SDS) on its own and various mixtures of the two surfactants.

Contact angles of the same compositions were also measured.

The measurements were made using a Kruss DSA30 Drop shape analyser.

The results of the surface tension measurements were as follows.

| Concentration (ppm) | Agnique SLS | Geropon SDS | Agnique SLS:Geropon SDS (1:2) | |
|---|---|---|---|---|
| | surface tension (mN/m) | | | |
| | | | theoretical | actual |
| 5 | 70.4 | 70.0 | 70.1 | 69.8 |
| 20 | 70.5 | 55.5 | 60.5 | 67.9 |
| 50 | 67.3 | 49.6 | 55.4 | 53.1 |
| 125 | 64.7 | 47.6 | 53.2 | 43.6 |
| 250 | 64.6 | 43.9 | 50.7 | 41.6 |

Synergistic behaviour is demonstrated at 125 and 250 ppm rates of combined adjuvants with a significantly lower actual surface tension. This is in-line with microscope observations which revealed the formation of unique structuring around the copper particles at the same rates that there is a rate dependent effect of the combined adjuvants although it also shows that the adjuvancy effect may come into play between 20 and 50 ppm where there is sufficiently low surface tension to provide a degree of wetting along with deposit structuring.

The contact angle measurements showed a similar trend. Agnique SLS has very little effect on contact angle with values >100° across all rates. For the Geropon SDS compositions, there is a stepwise reduction from 5 ppm onwards. Contact angles for the combination virtually mimic those of Geropon SDS alone showing the strong surface activity of this component. Increasing Geropon SDS concentrations increase wettability and surface coverage of sample droplets.

EXAMPLE 6

The interactions between the surfactants and also the interaction between the surfactants and the copper hydroxide were investigated by depositing samples of the spray composition employed in Example 5 onto glass microscope slides and onto a wax surface (purified beeswax), to more closely represent the waxy surface of plant foliage. The spray deposits were allowed to dry and then imaged at 100 times and 400 times magnification.

It was found that even at the lowest combined adjuvant concentration matrices form within the droplets, and associations with copper hydroxide occur when adjuvant films come into contact.

With a spray solution containing 15 ppm copper hydroxide, 7 ppm Agnique SLS and 13 ppm Geropon SDS the adjuvant coverage was shown to be widespread, forming connections with copper hydroxide particles when they come into contact. At ×400 magnification intermediary structures incorporating elements of Agnique SLS and Geropon SDS structuring are apparent and the combined adjuvant structuring is more localised around copper hydroxide particles, with clearly defined interactions.

A spray composition containing 15 ppm copper hydroxide, 42 ppm Agnique SLS and 83 ppm Geropon SDS shows increasing interactions between the adjuvants, leading to reduced total adjuvant coverage within the droplet. More complex, localised, and larger structures are formed, and are more commonly associated with copper hydroxide.

At the highest combined concentration tested (spray solution 15 ppm copper, 83 ppm Agnique SLS and 167 ppm Geropon SDS) adjuvant associations with copper hydroxide were shown to be complex, with numerous connections. Adjuvant matrices were shown to form indiscriminately, although it is more common for intricate structuring to occur in association with copper hydroxide.

Accordingly this study has shown a close link between the physical wetting properties of the adjuvant mixtures and the formation of synergistic complex structures.

Generally, Geropon SDS by itself will often form an indiscrete film, in which copper hydroxide particles can become entrapped. Conversely, Agnique SLS appears to closely associate with copper hydroxide particles via crystal seeding, using the copper hydroxide as a substrate.

Imperfections on the wax surface seem to promote greater crystal seeding and structuring from the adjuvants at the lower concentrations, when compared with images on glass surfaces. The observed behaviour is very consistent between glass and wax surfaces. The effect of the combined surfactant system has been shown to create a more mobile, interconnected system, entrapping and closely associating with copper particles. It further shows that increased wettability from the higher rates of Geropon SDS leads to increased probability of interactions between Agnique SLS and copper hydroxide, resulting in more widespread and effective structuring.

Higher concentrations have been shown to lead to synergistic interactions between the adjuvants leading to fewer discrete areas of coverage and instead larger, more complex, and localised structures are formed around the copper. This appears to correlate with the trend in reducing surface tension and contact angle producing better wetting of the surface, facilitating mobility of the adjuvants and the formation of complex structures. The existence of these unique macrostructures is believed to enhance the field performance of the spray solutions of this invention because of the concentration effect of adjuvants and the formation of a flexible, highly associated copper containing network across the surface.

The invention claimed is:

1. A pesticide spray composition comprising an aqueous composition containing:

i. 0.010 wt % to 3 wt % of copper metal derived from a copper salt, wherein the copper metal derived from the copper salt is selected from copper sulfate, copper hydroxide, cuprous oxide, copper oxychloride, copper ammonium carbonate, and copper octanoate; and ii. 0.0025 wt % to 10 wt % of a mixture of sodium dioctyl sulfosuccinate and sodium lauryl sulphate, wherein the mixture is a surfactant mixture;

wherein the pesticide spray composition is free of bicarbonate salts.

2. The pesticide spray composition according to claim 1, in which the ratio of sodium dioctyl sulfosuccinate and sodium lauryl sulphate is from 2:1 to 1:2 parts by weight.

3. The pesticide spray composition according to claim 1 containing from 0.001 wt % to 6 wt % of the surfactant mixture.

4. The pesticide spray composition according to claim 3, containing from 0.01 to 1 wt % of the surfactant mixture.

5. The pesticide spray composition according to claim 4, containing from 0.02 to 0.4 wt % of the surfactant mixture.

6. The pesticide spray composition according to claim 1, wherein the sodium lauryl sulfate present in the aqueous composition is equal to an amount of sodium dioctyl sulfosuccinate; the amount being by weight.

7. The pesticide spray composition according to claim 1, wherein the aqueous composition contains 0.015 wt % to 3 wt % of the copper metal derived from the copper salt.

8. The pesticide spray composition according to claim 1, wherein the composition is free of potassium and sodium bicarbonate.

9. The pesticide spray composition according to claim 1, wherein the sodium lauryl sulfate present in the aqueous composition is less than an amount of sodium dioctyl sulfosuccinate; the amount being by weight.

10. The pesticide spray composition according to claim 1, wherein the sodium lauryl sulfate present in the aqueous composition is greater than an amount of sodium dioctyl sulfosuccinate; the amount being by weight.

11. A pesticide formulation for mixing with water comprising:

i. from 5 wt % to 30 wt % of copper metal derived from a copper salt, wherein the copper metal derived from the copper salt in the formulation is selected from copper sulfate, copper hydroxide cuprous oxide, copper oxychloride, copper ammonium carbonate, and copper octanoate;

ii. from 3 wt % to 40 wt % sodium dioctyl sulfosuccinate; and iii. from 3 wt % to 40 wt % sodium lauryl sulfate.

12. A pesticide spray composition obtained by mixing the pesticide formulation according to claim 11 with water to produce a preparation that contains from 0.015% to 3% copper metal derived from a copper salt together with a surfactant mixture of the sodium dioctyl sulfosuccinate and the sodium lauryl sulfate diluted respectively by the same amounts.

13. The pesticide spray composition according to claim 12, wherein the preparation contains from 0.05% to 0.3% copper metal derived from the copper salt.

14. The pesticide spray composition according to claim 12, wherein the preparation contains from 0.25% to 1.5% copper metal derived from the copper salt.

* * * * *